Jan. 13, 1942. T. W. ROLPH 2,269,554
LUMINAIRE
Filed March 1, 1938 2 Sheets-Sheet 1
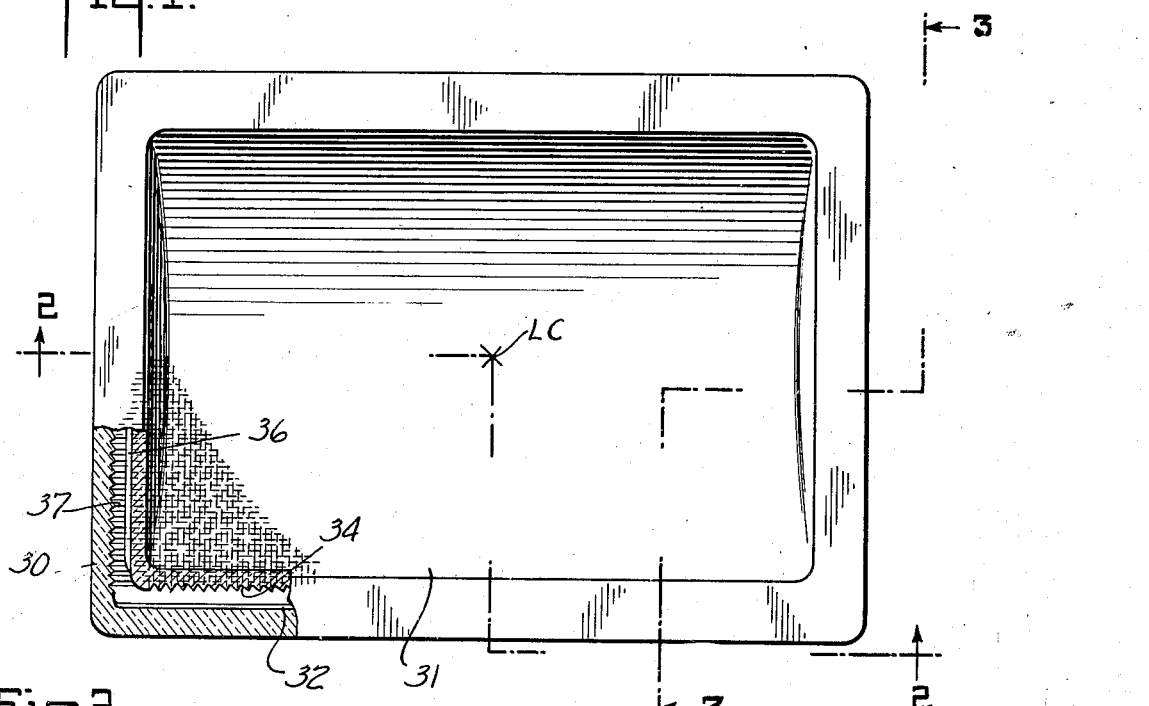
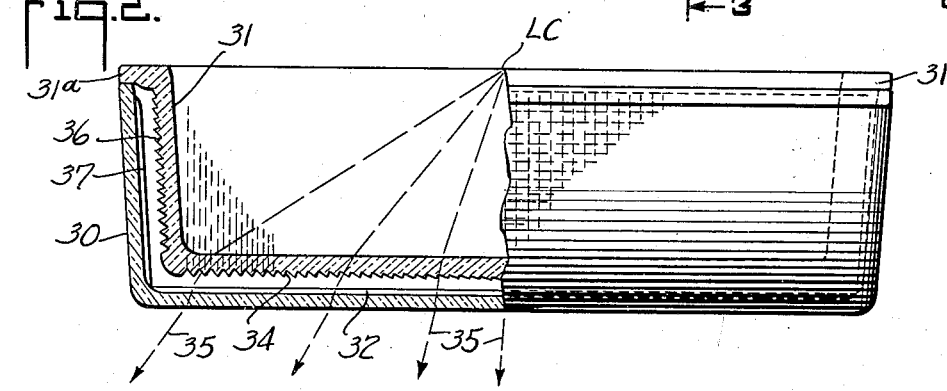
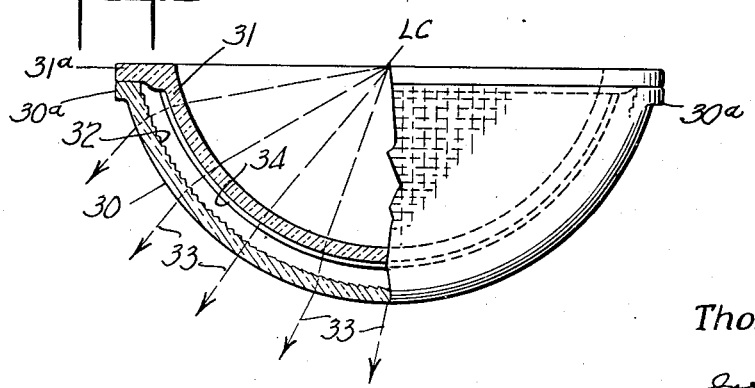
INVENTOR
Thomas W. Rolph
BY
ATTORNEY Jan. 13, 1942.                T. W. ROLPH                2,269,554
                               LUMINAIRE
                        Filed March 1, 1938        2 Sheets-Sheet 2
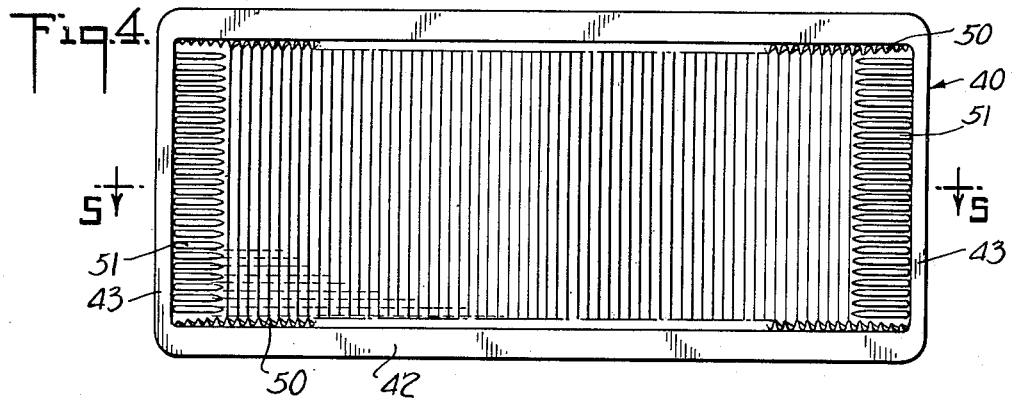
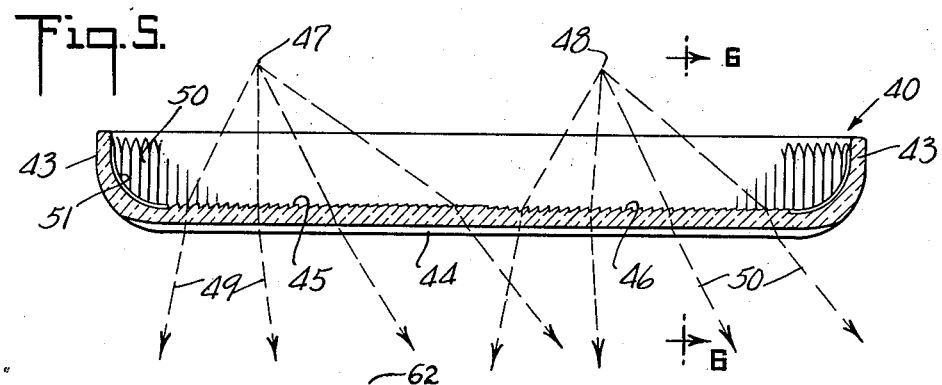
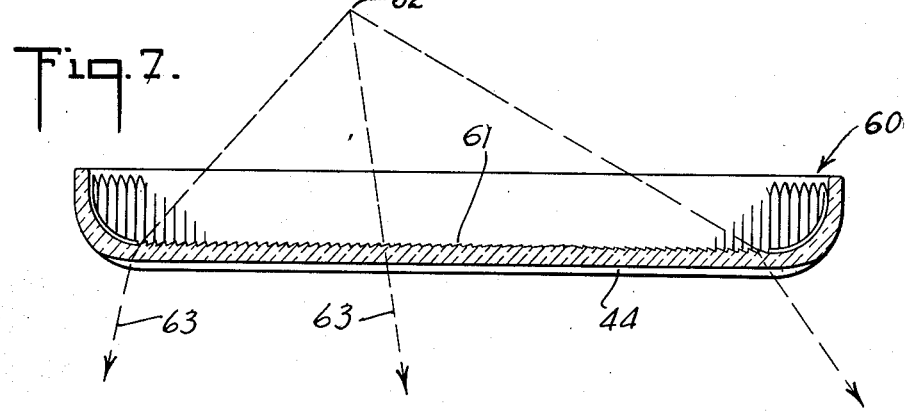
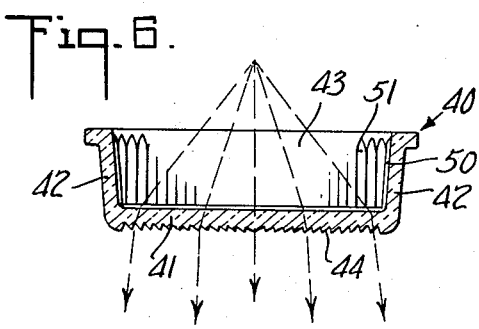
INVENTOR
*Thomas W. Rolph*
BY
ATTORNEY Patented Jan. 13, 1942

2,269,554

UNITED STATES PATENT OFFICE 2,269,554

LUMINAIRE

Thomas W. Rolph, Newark, Ohio, assignor to Holophane Company, Inc., New York, N. Y., a corporation of Delaware Application March 1, 1938, Serial No. 193,248

4 Claims. (Cl. 240—7.35)

The present invention relates to luminaires and is more particularly directed toward luminaires designed for the lighting of railway cars, street cars, busses and other vehicles and the like wherein seats are arranged in fixed positions relative to the car area.

In such vehicles the seating arrangement is practically always one such that the floor area of the vehicle may be considered to be divided into a number of identical or substantially identical rectangular areas. Such rectangular areas may include the portion of the car on opposite sides of the aisle which is normally occupied by two pairs of double seats arranged one in front of the other (usually having eight seating areas) or may include the half of this area on one side of the aisle or the two seating areas of a single double seat. Where the larger area is to obtain its principal lighting from a single lighting unit, the unit is placed near the ceiling over the aisle and according to the present invention the lighting unit has light concentrating prisms which build up the light in that rectangular area. Where areas above the seat or seats on one side of the aisle are to be lighted, the units are arranged over the seats and disposed so as to provide rectangular light distributions of appropriate size. These units may be offsetted relative to the center of the area and the beam directed in an oblique direction to cover the area. The various arrangements of lighting units contemplated by the present invention make it possible to place on the reading areas a satisfactory light intensity without glare, and sufficient spilled light is obtained from the units in a vehicle to light the non-reading areas, side walls and aisles.

The accompanying drawings show, for purposes of illustrating the present invention, several embodiments in which the invention may take form, it being understood that the drawings are illustrative of the invention rather than limiting the same.

In these drawings:

Figures 1, 2 and 3 are top plan, longitudinal, and transverse sectional views through one form of luminaire for car lighting, Figure 2 being taken on a broken line 2—2 of Figure 1, and Figure 3 being taken on the broken line 3—3 of Figure 1, parts being broken away to show interior construction;

Figures 4, 5 and 6 are top plan, longitudinal, and transverse sectional views through another form of luminaire for car lighting, Figure 5 being taken on the line 5—5 of Figure 4, and Figure 6 being taken on the line 6—6 of Figure 5; and Figure 7 is a longitudinal sectional view through a further modified form of construction.

In the arrangement shown in Figures 1, 2 and 3, the refractor is made up of two pieces 30 and 31, of prismatic light transmitting material. In plan view the refractor is rectangular. It has an arcuate cross-section in transverse planes so as to be cylindrical as shown in Figure 3. The upper surface of the lower or outer element 30 of the refractor is provided with longitudinally extending light concentrating prisms 32. These light concentrating prisms as shown in Figure 3, are arranged symmetrical with respect to two oblique axes through the light source LC so as to concentrate the light as indicated by the light rays 33. The lower surface of the inner refracting element 31 is provided with parallel prisms 34 which act on light from the light source to refract it as indicated by the rays 35.

The refractors 30 and 31 are nested as indicated and held in registry by flanges 31a on the inner refractor which overlie the edges of the outer refractor 30. The latter has flanges 30a to facilitate mounting the refractors in a suitable frame.

This form of luminaire is particularly adapted for use over the car aisle and when mounted in this position, the refractor is placed so that light is concentrated into two beams which span the aisle and fall on the opposite pairs of seats.

To obtain ceiling illumination, the end walls of the inner refracting element are provided with light elevating prisms indicated at 36 and the opposed walls of the outer refracting element are provided with diffusing flutes indicated at 37.

In the arrangement shown in Figures 4, 5, and 6, the refractor 40 has a flat bottom 41 and side and end walls 42 and 43. The lower surface of the bottom 41 of the refractor is provided with longitudinally extending light concentrating prisms 44, while the upper surface of the bottom of the refractor is provided with two sets of transversely extending light concentrating prisms 45 and 46. The prisms 45 form a lens system for a light source indicated at 47 while the prisms 46 form a lens system for a light source indicated at 48. These light sources are in the plane of the axis of the lower set of prisms and each is offsetted from the axial plane of the corresponding set of upper prisms so that the beams of light are tilted as indicated by the light rays 49 and 50.

The arrangement shown in Figures 4, 5 and 6 is designed for mounting over the double seat in offset relation. The side and end walls 42 and 43 may be provided with diffusing flutes 50 and 51.

The refractor 60 shown in Fig. 7, is substantially the same as the refractor shown in Figures 4, 5 and 6, except that the upper surface of the bottom of the refractor is provided with a single lens system 61 adapted to co-operate with the light source located at 62. The paths of light rays are indicated at 63.

It is obvious that the invention may be embodied in many forms and constructions within the scope of the claims and I wish it to be understood that the particular forms shown are but a few of the many forms. Various modifications and changes being possible, I do not otherwise limit myself in any way with respect thereto.

I claim:

1. A car lighting luminaire adapted for flush mounting in the ceiling of the car and comprising a light source, a refractor comprising two nested refractor parts, the inner part having peripheral flanges to fit the edges of the outer part and provide a rectangular opening to receive light from the source, the parts having substantially vertical opposed end walls of substantial depth and protruding below the ceiling so as to be in the line of vision of seated occupants of the car, at least one of the walls including vertical light diffusing flutes for laterally spreading light for ceiling illumination and obscuring the source, the bottom of one refractor part having a series of light concentrating prisms parallel with two opposite side edges of the refractor part, the bottom of the other refractor part having a series of light concentrating prisms opposed to the first series of prisms and at right angles thereto, the light source being in the focal line of the set of prisms parallel with the length of the rectangle to spread an intense beam over a rectangular area below the luminaire, the refractor parts being of arcuate cross section in vertical planes across the width of the rectangle.

2. A car lighting luminaire adapted for flush mounting in the ceiling of the car and comprising a light source, a refractor comprising two nested refractor parts, the inner part having peripheral flanges to fit the edges of the outer part and provide a rectangular opening to receive light from the source, the parts having substantially vertical opposed end walls of substantial depth and protruding below the ceiling so as to be in the line of vision of seated occupants of the car, at least one of the walls including vertical light diffusing flutes for laterally spreading light for ceiling illumination and obscuring the source, the bottom of one refractor part having a series of light concentrating prisms parallel with two opposite side edges of the refractor part, the bottom of the other refractor part having a series of light concentrating prisms opposed to the first series of prisms and at right angles thereto, the light source being in the focal line of the set of prisms parallel with the length of the rectangle to spread an intense beam over a rectangular area below the luminaire, the refractor parts being semi-cylindrical and the longitudinal extending prisms concentrating the light into two oblique beams.

3. A car lighting luminaire adapted for flush mounting in the ceiling of the car and comprising a light source, a refractor comprising two nested refractor parts, the inner part having peripheral flanges to fit the edges of the outer part and provide a rectangular opening to receive light from the source, the parts having substantially vertical opposed end walls of substantial depth and protruding below the ceiling so as to be in the line of vision of seated occupants of the car, at least one of the walls including vertical light diffusing flutes for laterally spreading light for ceiling illumination and obscuring the source, the bottom of one refractor part having a series of light concentrating prisms parallel with two opposite side edges of the refractor part, the bottom of the other refractor part having a series of light concentrating prisms opposed to the first series of prisms and at right angles thereto, the light source being in the focal line of the set of prisms parallel with the length of the rectangle to spread an intense beam over a rectangular area below the luminaire, the refractor parts being semi-cylindrical and the vertical end walls on one part being provided with light elevating prisms.

4. A car lighting luminaire comprising a flat bottomed rectangular shaped refractor having in the lower surface of the bottom longitudinally extending light concentrating prisms and on the upper surface of the bottom two sets of transversely disposed light concentrating prisms, and a light source disposed over each set of transverse prisms and in the axial plane of the lower set of prisms.

THOMAS W. ROLPH.